United States Patent
Zaopo et al.

(10) Patent No.: US 7,274,854 B2
(45) Date of Patent: Sep. 25, 2007

(54) POLYIMIDE OPTICAL WAVEGUIDES AND METHOD FOR THE PREPARATION THEREOF

(75) Inventors: Antonio Zaopo, Milan (IT); Yuri A. Dubitsky, Milan (IT); Marco Colombo, Cantu' (IT)

(73) Assignee: Pirelli & C. S.p.A., Milan (IT)

( * ) Notice: Subject to any disclaimer, the term of this patent is extended or adjusted under 35 U.S.C. 154(b) by 214 days.

(21) Appl. No.: 10/518,352

(22) PCT Filed: Jun. 27, 2002

(86) PCT No.: PCT/EP02/07107

§ 371 (c)(1),
(2), (4) Date: Aug. 15, 2005

(87) PCT Pub. No.: WO2004/003602

PCT Pub. Date: Jan. 8, 2004

(65) Prior Publication Data

US 2007/0122102 A1    May 31, 2007

(51) Int. Cl.
G02B 6/00 (2006.01)
C08G 73/00 (2006.01)

(52) U.S. Cl. .............. 385/143; 385/141; 385/145; 528/170; 528/173

(58) Field of Classification Search ........ 385/141–145, 385/129; 528/170, 173
See application file for complete search history.

(56) References Cited

U.S. PATENT DOCUMENTS

| | | | |
|---|---|---|---|
| 4,629,777 A | 12/1986 | Pfeifer | |
| 4,657,832 A | 4/1987 | Pfeifer | |
| 5,572,619 A | 11/1996 | Maruo et al. | |
| 5,598,501 A | 1/1997 | Maruo et al. | |
| 5,609,797 A | 3/1997 | Chakravorty | |

(Continued)

FOREIGN PATENT DOCUMENTS

EP    0 454 590 A2    10/1991

(Continued)

OTHER PUBLICATIONS

Lin, A. A. et al., "On the Cross-Linking Mechanism of Benzophenone-Containing Polyimides,", Macromolecules, vol. 21, No. 4, pp. 1165-1169, (1988).

(Continued)

*Primary Examiner*—Hemang Sanghavi
(74) *Attorney, Agent, or Firm*—Finnegan, Henderson, Farabow, Garrett & Dunner, L.L.P.

(57) ABSTRACT

An optical waveguide has a core layer made by a film containing a cross-linked polyamide based on a repeating unit of general formula (I) and a method for the production thereof.

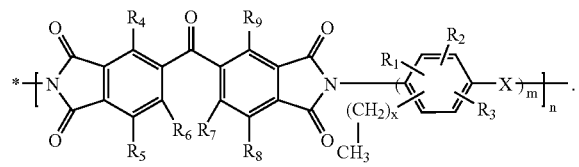

7 Claims, 1 Drawing Sheet

U.S. PATENT DOCUMENTS 6,842,576 B2 * 1/2005 Mune et al. ............ 385/141

FOREIGN PATENT DOCUMENTS

| EP | 0 720 030 A1 | 7/1996 |
|----|---|---|
| GB | 2 053 941 A | 2/1981 |
| WO | WO93/07538 | 4/1993 |
| WO | WO94/14874 | 7/1994 |

OTHER PUBLICATIONS

Jeong, J. W. et al., "Photodefinable Polyimide as an Effective New Material for Passive Photonic Devices", Journal of the Korean Physical Society, vol. 39, No. 2, pp. 250-254, (Aug. 2001).

* cited by examiner

POLYIMIDE OPTICAL WAVEGUIDES AND METHOD FOR THE PREPARATION THEREOF

CROSS REFERENCE TO RELATED APPLICATIONS

This application is a national phase application based on PCT/EP2002/007107, filed Jun. 27, 2002, the content of which is incorporated herein by reference.

BACKGROUND OF THE INVENTION

1. Field of the Invention

The present invention relates to optical waveguides based on polyimides and to a method for the preparation thereof.

2. Description of the Related Art

The implementation of optical communication systems, made possible through the development of low loss optical fibers, is associated with the need for the development of various components useful in such field. Particularly, there is considerable demand for optical circuits and components thereof which support high throughput of communication signals, especially for optical waveguides applicable to such systems.

An optical waveguide comprises an optical core material embedded in a cladding material.

Among the various known polymers, polyimides provide very high resistance to heat and are employed in the field of electronics as optical waveguides. The use of polyimides in the optical communication fields provides two main advantages: excellent transparency in the visible and near infrared region and a refractive index variable in a wide range.

U.S. Pat. Nos. 5,572,619 and 5,598,501 discloses describe polyimide optical waveguides and methods for manufacturing them, in particular disclose a polyimide optical waveguide comprising a core made of a polyimide whose refractive index is controlled to a predetermined value by electron beam irradiation. Manufacturing is performed by a method of comprising the steps of:

forming a first polyimide layer on a substrate;

forming a core layer having a predetermined refractive index by irradiating said polyimide layer with an electron beam;

forming a second polyimide layer on said core layer and removing said substrate, thereby forming a polyimide film having a two-layer structure; and bonding said second polyimide layer as a lower cladding to another substrate, thereby forming a core having a predetermined shape in said core layer.

Also, it is provided a method of manufacturing a polyimide optical waveguide, comprising steps of:

forming a first polyimide layer on a substrate;

forming a second polyimide layer on the first polyimide layer, the second polyimide layer having a refractive index higher than that of the first polyimide layer, forming a third polyimide layer on the second polyimide layer, the third polyimide layer having a refractive index lower than that of the second polyimide layer; and performing electron beam lithography on the three polyimide layers, thereby forming a core in the second polyimide layer, the core having a predetermined refractive index and a predetermined shape.

The use of electron beam irradiation for changing the refractive index of a polymer or for performing a lithography yields some disadvantages. The electrons must be drained once they passed through the polymer, thus it is necessary to provide the polymer layer with a conductive substrate (e.g. of silicon, as in the above mentioned patents), which is to be removed for further processing. As a consequence of the use of said conductive layer, there may be a step of separation of the irradiated polymeric layer, said separation being critical in view of the thin thickness of the layer (in the order of µm).

J. W. Jeong et al., Journal of the Korean Physical Society, Vol. 39, No. 2 (2001), 250-254 disclose a photodefinable polyimide as useful in passive photonic devices, according to a method of preparation as from the following scheme:

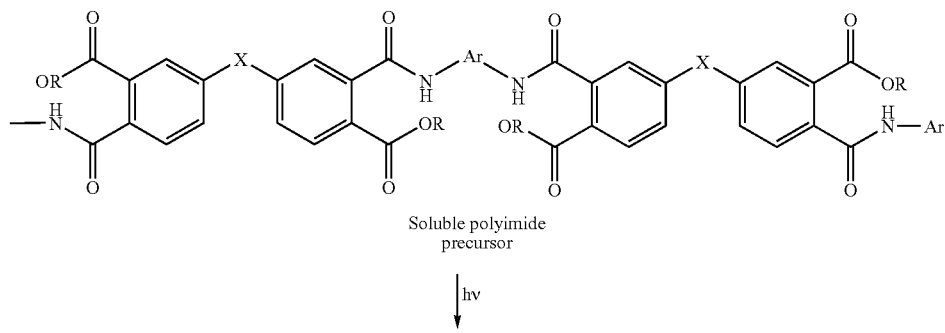

Soluble polyimide precursor

↓ hv

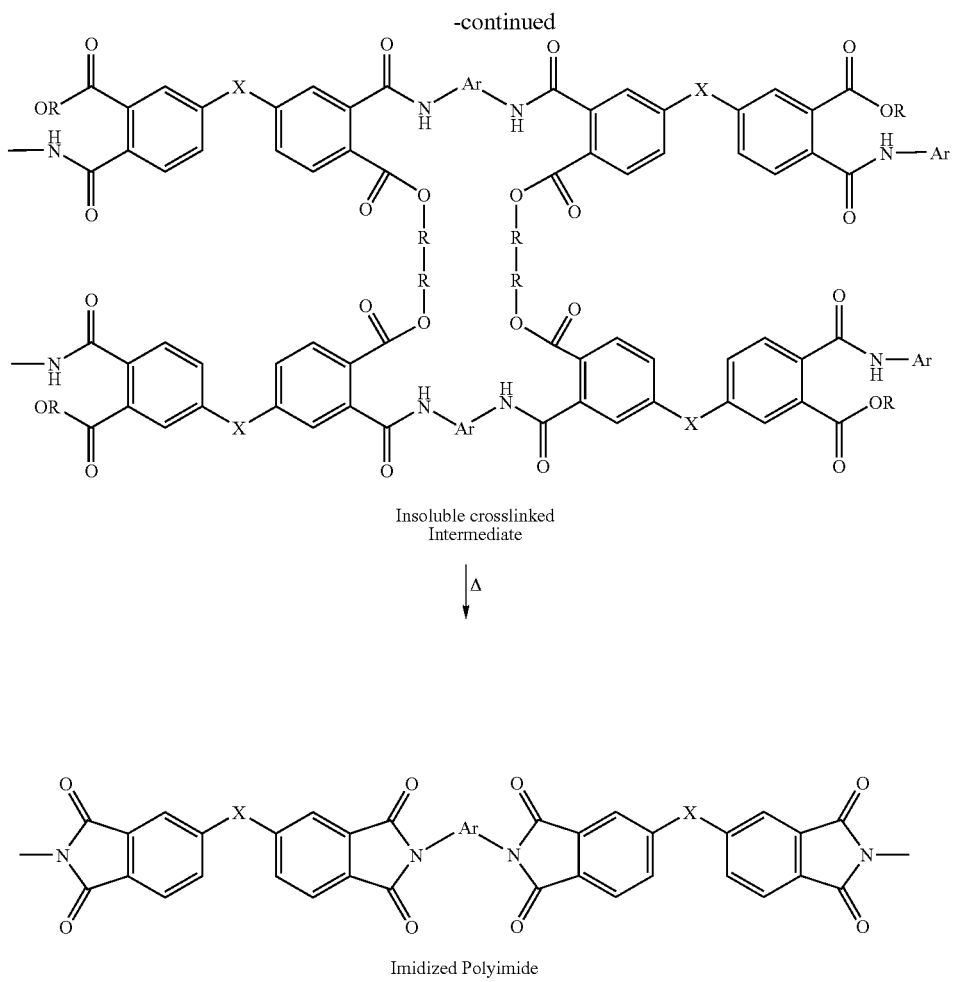

Insoluble crosslinked Intermediate

↓ Δ

Imidized Polyimide (wherein R is —CH$_2$CH$_2$—OCO—C(CH$_3$)=CH$_2$; no specific meaning is provided for Ar and X). A soluble aromatic polyimide precursor is spin-coated, suitably photomasked and exposed to UV radiation to form a cross-linked polyimide precursor. After development, the cross-linked precursor is subsequently converted to fully imidized polyimide by thermal curing.

SUMMARY OF THE INVENTION

The Applicant has found that optical waveguides based on polyimide can be obtained by spin-coating said polymer on a substrate and changing the polyimide refractive index by UV irradiation thus forming a cross-linked material.

Therefore, the present invention relates to an optical waveguide comprising:

a) a support layer;

b) a core layer including a cross-linked polymeric material obtained by UV irradiation of a polyimide having repeating units of formula (I)

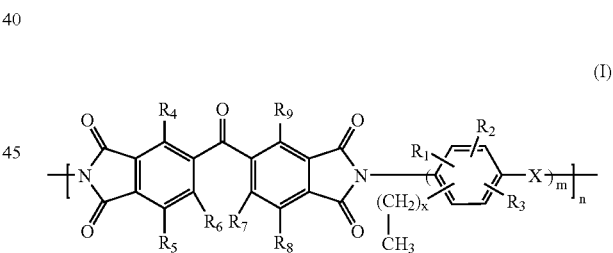

wherein $R_1$, $R_2$, and $R_3$ independently represent hydrogen or a ($C_1$-$C_6$)-alkyl group, $R_4$, $R_5$, $R_6$, $R_7$, $R_8$ and $R_9$ independently represent hydrogen, a ($C_1$-$C_6$)-alkyl group, a ($C_1$-$C_6$)alkenyl or an aryl group;

X is selected from a covalent bond; a (—CH$_2$—)$_y$ group, wherein y is an integer from 1 to 10; O; S; NR, wherein R is ($C_1$-$C_4$)alkyl, x is 0-5, m is 1-10 n is an integer having an average value of from 5 to 50,000, and the deuterated derivatives thereof.

By UV irradiation, it is believed that the cross-linking mainly occurs between (—CH$_2$—)$_x$CH$_3$ groups and the carbonyl group bridging the isoindole-1,3-dione moieties, thus obtaining a cross-linked polyimide having the following general formula:

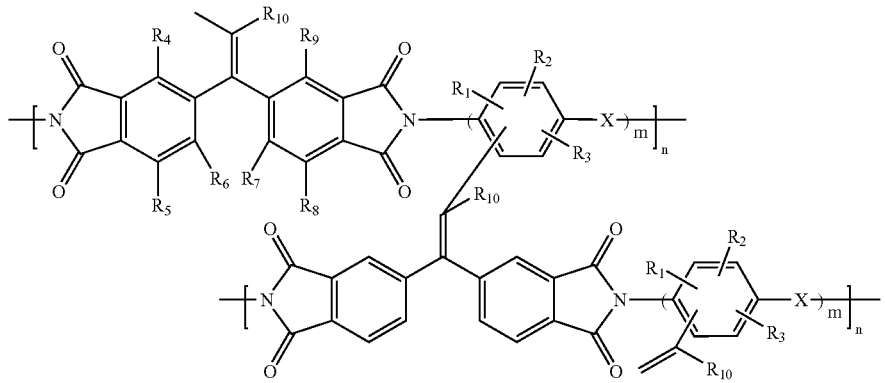

wherein $R_1$, $R_2$, $R_3$, $R_4$, $R_5$, $R_6$, $R_7$, $R_8$, $R_9$, X, m and n are as in formula (I), and $R_{10}$ represents hydrogen or a $(C_{1-4})$alkyl group.

Preferably, in general formula (I) $R_1$, $R_2$, $R_3$ and $R_4$ independently represent hydrogen or a $(C_1-C_3)$alkyl group.

The support layer may be of any suitable material, for example glass or a polymer having a known refractive index different from that of the cross-linked polyimide of the invention, preferably lower. Such substrate material does not change its refractive index by UV irradiation or change it in a known manner.

The optical waveguide of the present invention may further comprise a cladding layer disposed over said core layer on the opposite side of that of the support layer. If said cladding layer is disposed before the UV irradiation of the core layer, it is advantageously UV-transparent and its refractive index may remain unchanged after UV treatment or change in a known manner.

According to another aspect, the present invention relates to a method for producing an optical waveguide comprising the steps of a) spin-coating a polyimide of general formula (I)

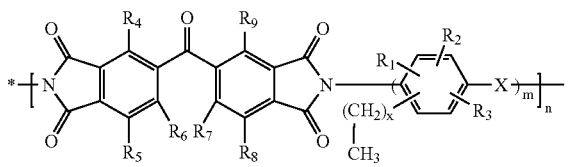

(I)

wherein $R_1$, $R_2$, and $R_3$ independently represent hydrogen or a $(C_1-C_6)$-alkyl group, $R_4$, $R_5$, $R_6$, $R_7$, $R_8$ and $R_9$ independently represent hydrogen, a $(C_1-C_6)$-alkyl group, a $(C_1-C_6)$alkenyl or an aryl group;

X is selected from a covalent bond; a $(-CH_2-)_y$ group, wherein y is an integer from 1 to 10; O; S; NR, wherein R is $(C_1-C_4)$alkyl, x is 0-5, m is 1-10 n is an integer having an average value of from 5 to 50,000, and the deuterated derivatives thereof, on a substrate layer, to obtain a film of the polyimide of formula (I);

b) irradiating the film with UV radiation according to a selected pattern;

The method according to the present invention can further comprise the step of spin-coating a cladding layer over the core layer.

The polyimide of formula (I) is synthesized in a known manner, for example by condensation of a tetracarboxylic acid or a derivative thereof with a diamine in accordance with what taught by A. A. Lin, V. R. Sastri, G. Tesoro, A. Reiser, and R. Eachus, Macromolecules, 21 (1988) pp. 1165-1169.

The polyimide of the invention may be spin-coated on the support in form of a solution in an organic solvent. Said organic solvent is then removed before the UV irradiation procedure. Following the UV irradiation, the polyimide layer may be further dried.

The waveguide may be modeled to specify almost any arbitrary rectilinear structure that is bounded by a rectangular box. Any symmetry is specified by setting the suitable boundary conditions.

Waveguides may be prepared by two different techniques: 1) the use of conventional photolitography; and 2) the use of direct or focused beam light source. In the first technique, a mask having the desired waveguide pattern is placed between the polyimide layer and the source of UV radiation. The mask have transparent and opaque portions, which allow the radiation to pass only through the transparent portions and fall only on the regions of the layer surface where an increase of refractive index was desired. An incoherent light source is used in the photolithographic technique.

In the second technique, the focused or directed beam source is a laser. The pattern of the waveguide is made by moving either the substrate or the beam source (while the other remains stationary) in such a way that the directed beam or focused beam contacts only the desired predetermined regions of the polymer layer. These directed or focused beam techniques are known in the art as "direct writing" methods.

BRIEF DESCRIPTION OF THE DRAWING

The invention will be further illustrated hereinafter with reference to the following examples and FIGURE, wherein.

DETAILED DESCRIPTION OF THE INVENTION

Example 1

Figure 1:
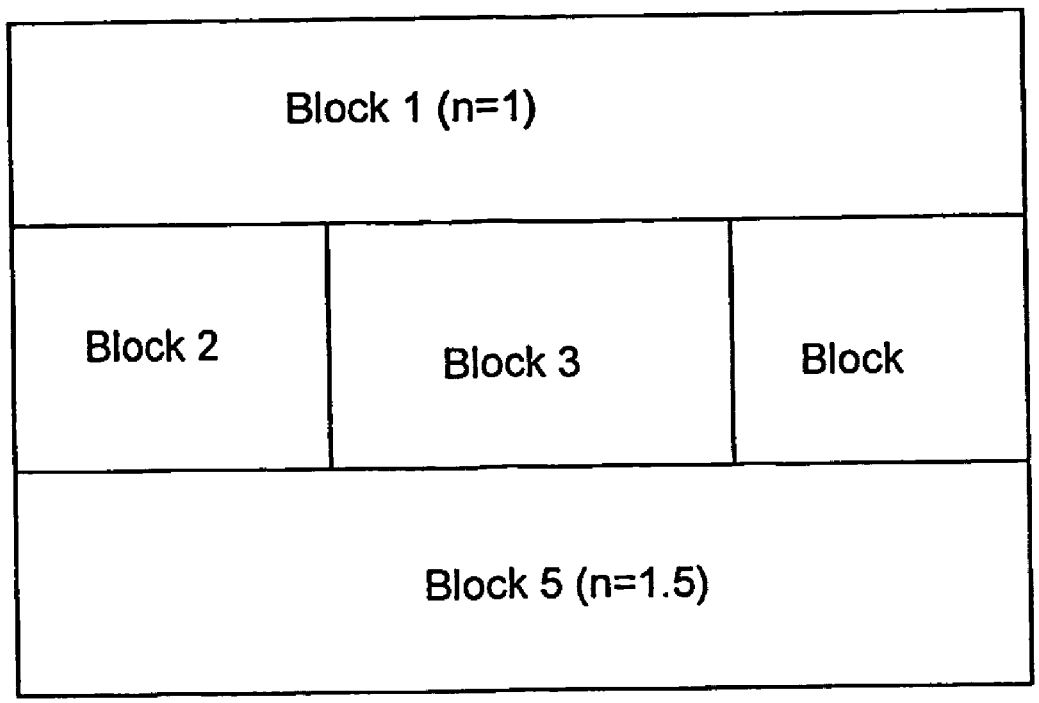
FIG. 1 illustrates an optical wave-guide pattern according to the invention.

Synthesis of a polyimide based on 3,3',4,4'-benzophenonetetracarboxylic dianhydride and tetramethylmethylenedianiline

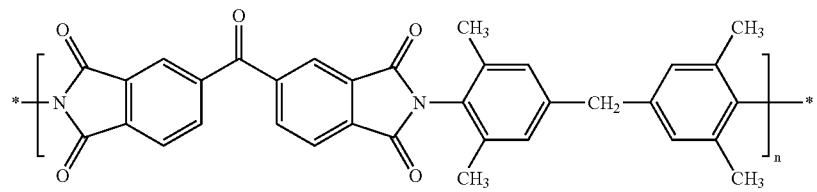

The polyimide in title was prepared by condensation of 3,3',4,4'-benzophenonetetracarboxylic dianhydride (Aldrich, 98%) with tetramethylmethylenedianiline (Novosibirsk Chemical Plant, 98%) in accordance to A. A. Lin, V. R. Sastri, G. Tesoro, A. Reiser, and R. Eachus, Macromolecules, 21 (1988) pp. 1165-1169.

3,3',4,4'-Benzophenonetetracarboxylic dianhydride was recrystallized from acetic anhydride and dried under reduced pressure at 200° C. Tetramethylmethylenedianiline was used as received. Tetrachloroethane (Aldrich, 98%), dimethylformamide (Aldrich, 99.9+%) and methanol (Aldrich, 99.8+%) were used without further purification.

The resulting was thrice reprecipitated from dimethylformamide solution to methanol and dried under reduced pressure at 200° C. Inherent viscosity 0.82 dL/g in dimethylformamide indicates that n is approximately 850.

Example 2

Films of the polyimide of Example 1 on standard BK-7 glass substrates were prepared from degassed in vacuum 10% polyimide solution in tetrachloroethane by spin-coating procedure, using a Karl-Suss model RC-8 apparatus (Karl-Suss France-France) under a rotation speed of 1500 rpm. Films thus obtained were left at room temperature for 6 hours and then dried under reduced pressure at 120° C. for two hours for eliminating of the remaining solvent.

The polyimide films were exposed to an unfiltered UV light of 200 W mercury UV lamp for 5 minutes, thus yielding the corresponding cross-linked polyimide.

The films containing cross-linked polyimide were dried under reduced pressure at 120° C. for two hours for eliminating of the traces of formed water.

Example 3

Optical properties of the films obtained in Example 2 were measured with a Metricon model 2010 Prism Coupler (Metricon Corporation, Pennington, N.J.-USA). The results of the measurements are reported in Table.

TABLE 1

Experimental data relating to the optical measurements and absorption coefficients at $\lambda = 1550$ nm.

| Polymer | n | α (dB/cm) | Δn |
|---|---|---|---|
| Polyimide (Ex. 1) | 1.5999 | 0.90 | |
| Cross-linked Polyimide (Ex. 2) | 1.6020 | 0.88 | $2.1 \times 10^{-3}$ |

The refractive index difference (Δn) to enables a monomodal propagation at 1550 nm on optical sections of some μm², suitable for the realization of an optical device and for the connection to optical fibers.

The optical losses (α) are suitable for optical paths (some cm) typically employed in marketed devices.

Example 4

Using the data reported in Table 1 and refractive indexes of air (n=1) and BK-7 glass (n=1.5), an optical waveguide was designed by a method based on a finite difference implementation of the vector electromagnetic wave equation. The basic structure is schematically shown in FIG. 1.

The waveguide was modeled using conventional a Fwave version IV software (Nanoelectronics Research Center, Dept. of Electronics and Elec. Eng., The University of Glasgow, Scotland, UK) and represents a rib guide, Setting the values of the refractive indices of non cross-linked polyimide in blocks 2 and 4 and the refractive index of the cross-linked one in block 3 it is possible to calculate the dimension of the waveguide for the single mode propagation. Thus, the single mode propagation waveguide based on polyimide has a dimension 2.8×2.8 μm.

A "direct writing" procedure for the waveguide preparation was used focusing 2.8 μm UV radiation beam, produced by 248 nm excimer laser at 20 pulses/sec., 300 mJ/pulse, through quartz optical fiber on non bleached BTDM film of 2.8 μm thickness. The optical fiber was connected with custom-made "direct" writing device, controlled by optical microscope.

What is claimed is:
1. An optical waveguide comprising:
 a) a support layer;
 b) a core layer including a cross-linked polymeric material obtained by UV irradiation of a polyamide having repeating units of formula (I)

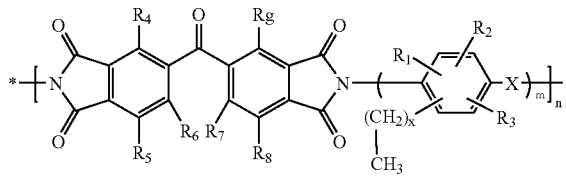

(I)

wherein $R_1$, $R_2$, and $R_3$ independently represent hydrogen or a ($C_1$-$C_6$)-alkyl group, $R_4$, $R_5$, $R_6$, $R_7$, $R_8$ and $R_9$ independently represent hydrogen, a ($C_1$-$C_6$)-alkyl group, a ($C_1$-$C_6$)alkenyl or an aryl group;

X is selected from a covalent bond; a (—$CH_2$—)$_y$ group, wherein y is an integer from 1 to 10; O; S; NR, wherein R is ($C_1$-$C_4$)alkyl, x is 0-5, m is 1-10, and n is an integer having an average value of from 5 to 50,000, and the deuterated derivatives thereof.

2. The optical waveguide according to claim 1, wherein $R_1$, $R_2$, $R_3$ and $R_4$ independently represent hydrogen or a ($C_1$-$C_3$)alkyl group.

3. The optical waveguide according to claim 1, wherein said support has a refractive index lower than that of said cross-linked polymeric material.

4. The optical waveguide according to claim 1, wherein said support layer is a glass layer.

5. The optical waveguide according to claim 1, further comprising a cladding layer disposed over said core layer on the opposite side of that of the support layer.

6. A method for producing an optical waveguide comprising the steps of a) spin-coating a polyimide of general formula (I)

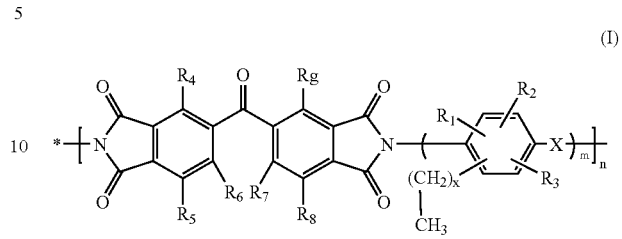

(I)

wherein $R_1$, $R_2$, and $R_3$ independently represent hydrogen or a ($C_1$-$C_6$)alkyl group, $R_4$, $R_5$, $R_6$, $R_7$, $R_8$ and $R_9$ independently represent hydrogen, a ($C_1$-$C_6$)alkyl group, a ($C_1$-$C_6$)alkenyl or an aryl group;

X is selected from a covalent bond; a (—CH—)$_y$ group, wherein y is an integer from 1 to 10; O; S; NR, wherein R is ($C_1$-$C_4$)alkyl, x is 0-5, m is 1-10, and n is an integer having an average value of from 5 to 50,000, and the deuterated derivatives thereof, on a substrate layer to obtain a film of the polyamide of formula (I); and b) irradiating the film with UV radiation according to a selected pattern.

7. The method according to claim 6, further comprising the step of spin-coating a cladding layer over the core layer.

* * * * *

UNITED STATES PATENT AND TRADEMARK OFFICE
CERTIFICATE OF CORRECTION

PATENT NO. : 7,274,854 B2
APPLICATION NO. : 10/518352
DATED : September 25, 2007
INVENTOR(S) : Zaopo et al.

It is certified that error appears in the above-identified patent and that said Letters Patent is hereby corrected as shown below:

Claim 1, column 9, lines 1-10,

"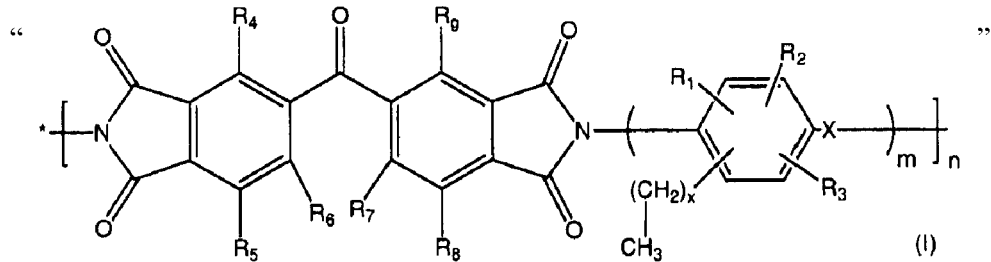"

should read

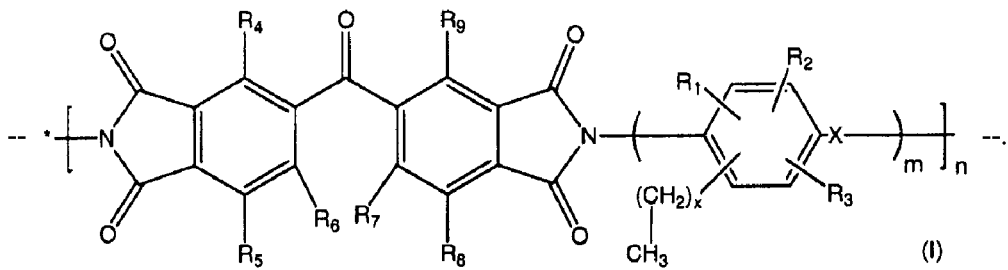

Claim 1, column 9, line 18, "$(-CH_2-)_y$" should read -- $(CH_2)_y$ --.

UNITED STATES PATENT AND TRADEMARK OFFICE
CERTIFICATE OF CORRECTION

PATENT NO.       : 7,274,854 B2
APPLICATION NO. : 10/518352
DATED            : September 25, 2007
INVENTOR(S)      : Zaopo et al.

It is certified that error appears in the above-identified patent and that said Letters Patent is hereby corrected as shown below:

Claim 6, column 10, lines 6-14,

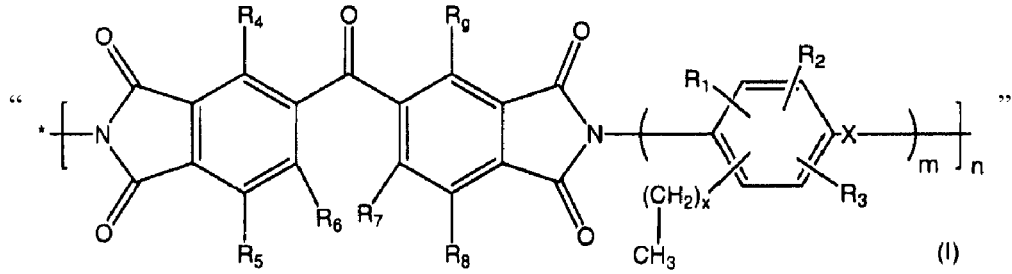

should read

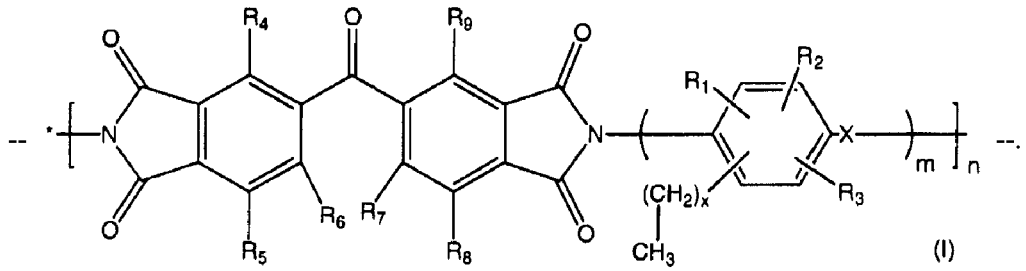

Claim 6, column 10, line 20, "(—CH—)$_y$" should read -- (CH$_2$)$_y$ --.

Signed and Sealed this

Third Day of June, 2008

JON W. DUDAS
*Director of the United States Patent and Trademark Office*